(12) United States Patent
Gupta et al.

(10) Patent No.: US 7,332,138 B2
(45) Date of Patent: Feb. 19, 2008

(54) JET MIXING OF PROCESS FLUIDS IN FIXED BED REACTOR

(75) Inventors: Ramesh Gupta, Berkeley Heights, NJ (US); Robert Koros, Westfield, NJ (US); Ramesh R. Hemrajani, Millington, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 420 days.

(21) Appl. No.: 10/206,103

(22) Filed: Jul. 26, 2002

(65) Prior Publication Data

US 2004/0018128 A1    Jan. 29, 2004

(51) Int. Cl.
*B01J 8/04* (2006.01)
(52) U.S. Cl. ............... 422/194; 422/191; 422/207; 422/190
(58) Field of Classification Search ............... None
See application file for complete search history.

(56) References Cited

U.S. PATENT DOCUMENTS

| | | | |
|---|---|---|---|
| 602,240 A * | 4/1898 | Pendleton, Jr. | 242/118.61 |
| 2,948,671 A * | 8/1960 | Packie et al. | 208/134 |
| 3,894,937 A | 7/1975 | Bonacci et al. | 208/89 |
| 4,313,908 A | 2/1982 | Gupta | |
| 4,350,665 A | 9/1982 | Akatsu et al. | 422/191 |
| 4,669,890 A * | 6/1987 | Peyrot | 366/341 |
| 4,960,571 A | 10/1990 | Bhagat et al. | |
| 5,232,283 A * | 8/1993 | Goebel et al. | 366/336 |
| 5,407,647 A | 4/1995 | Tarancon | 422/171 |
| 5,484,578 A | 1/1996 | Muldowney et al. | |
| 5,799,877 A | 9/1998 | Gupta et al. | |
| 6,455,015 B1 * | 9/2002 | Kilroy | 422/194 |
| 6,833,126 B2 * | 12/2004 | Komaki et al. | 423/652 |

FOREIGN PATENT DOCUMENTS

| | | |
|---|---|---|
| DE | 25 43 139 | 3/1977 |
| DE | 19909724 | 9/2000 |
| EP | 0 293 546 | 12/1988 |
| GB | 602240 | 5/1948 |

OTHER PUBLICATIONS

Litchfield et al, "Optimization of Interbed Distributors," paper presented at 1996 National Petroleum Refiners Association (NPRA) Annual meeting Mar. 17-19, 1996.
Sarli et al, "Improved Hydrocracker Temperature Control; Mobil Quench Zone Technology," paper presented at 1993 National Petroleum Refiners Association (NPRA) Annual Meeting Mar. 21-23, 1993.
Christian article titled, "Experimental Study of Mixing Performances Using Steady State and Unsteady Jets," in Cheremisinoff (editor) Mixed-Flow-Hydrodyn. (Gulf Publishing, Houston, TX 1996).
"Chemie Ingenieur Technik: Verfahrenstecknik Technische Chemie Apparatewesen," Nov. 1974, CITEAH 46(21) 881-924 (1974).
Froment, "Analysis and Design of Fixed Bed Catalytic Reactors," paper presented at The First International Symposium on Chemical Reaction Engineering Jun. 8-10, 1970.

* cited by examiner

*Primary Examiner*—Glenn Caldarola
*Assistant Examiner*—Kaity V. Handal
(74) *Attorney, Agent, or Firm*—Glenn T. Barrett (57) ABSTRACT

A fixed bed catalytic reactor for converting process fluids having an upper catalyst bed and a lower catalyst bed below the upper catalyst bed for converting process fluids flowing through the upper and lower beds. A mixing zone is located between the upper bed and lower beds, and at least one jet is provided for injecting an inclined fluid jet into the mixing zone against the flow of the process fluids to entrain process fluids within the jet and to radially mix the process fluids across the mixing zone.

17 Claims, 5 Drawing Sheets

JET MIXING OF PROCESS FLUIDS IN FIXED BED REACTOR

FIELD

The present invention relates to mixing of process fluids in a fixed bed reactor. More particularly, the present invention relates to a method and means for injecting jet force to provide radial mixing of process fluids between catalyst beds in a fixed bed reactor.

BACKGROUND

Fixed bed reactors are often used in petroleum refining and chemicals for hydrocracking, hydroprocessing and reforming. These reactors are usually, but not necessarily cylindrical, and can have a diameter up to about 20 feet or larger, frequently with a height of about 20 ft to more than 100 ft, depending upon the application. Fixed bed reactors are filled with the catalyst particles, which are typically about 1 to 2 mm in size, but may be smaller or larger.

Typically, a reactor has multiple catalyst beds, two or more beds depending upon the application of the reactor. The usual feed to the reactor is an oil and may also include hydrogen. The purpose of the hydrogen depends on the operational function of the reactor, such as to hydrodesulfurize the feed, or to remove nitrogen, or to saturate aromatics, or to hydrocrack the feed.

In hydrocracking, processes having high temperatures and/or pressures and/or added hydrogen are used to crack large molecules into smaller more usable molecules. These reactors are used very often in petroleum industry for desulfurization, denitrogenation, aromatic saturation and hydrocracking.

There are many other reactions. But a common problem with the reactions in the fixed bed units is that most of the reactions are exothermic, i.e., as the feed flows through the reactor the temperature of the processed fluid increases. Further, these processes are constrained by radial temperature maldistributions. These temperature maldistributions cause significant safety and operations problems. For example, the safe operating windows in hydrocrackers is often constrained by temperature maldistribution in catalyst beds. In addition to safety, temperature maldistribution causes premature catalyst deactivation leading to much shorter run lengths. Also, temperature maldistribution often leads to poor product selectivity and higher hydrogen consumption.

Radial temperature maldistributions, i.e., temperature variations along the diameter of a catalyst bed may be quite significant, and at times the variations are as large as the temperature rise along the length of the bed. This lateral temperature maldistribution may be caused by many sources. There may be nonuniform flow, meaning higher vertical flow in one area of the bed than in other areas of the bed. When a fluid spends more time in the bed, the temperature can rise to a higher level, thus causing temperature gradients along cross-sectional portions of the unit. Such nonuniform flow can be caused by localized fouling, e.g., by an obstruction resulting from formation of polymer or coke in the catalyst bed. Nonuniform flow can also be caused by catalyst packing, which is not uniform and thus causes obstructions to occur more quickly in the more densely packed areas. There are many other reasons that may not be fully understood for causing radial temperature maldistribution. But, there is no doubt that there can be very large radial temperature maldistribution.

Temperature maldistribution in a catalyst bed normally gets propagated to the next downstream catalyst bed because of poor radial mixing in fixed beds. This propagated maldistribution gets further amplified because the reaction rates (heat generation rates) increase with temperature. This "snow balling" effect can lead to unsafe temperatures which can result in the above noted safety and operations problems, runaway reaction, catalyst deactivation, and catalyst fusion agglomeration.

Quench boxes, such as disclosed in U.S. Pat. No. 4,960,571, are often located between catalyst beds to control the reaction temperature and to provide radial mixing so that the temperature maldistributions from an upstream bed do not get propagated to a downstream bed. However, the quench boxes are expensive. Also, quench boxes are difficult to retrofit in existing reactors. U.S. Pat. No. 4,960,571 is hereby incorporated herein by reference.

It is apparent that there is a need for a simplified and relatively inexpensive technology to minimize temperature maldistribution in fixed bed catalytic reactors.

SUMMARY

In accordance with a broad aspect of the present invention, there is provided a fixed bed catalytic reactor for converting process fluids comprising an upper catalyst bed and a lower catalyst bed below the upper catalyst bed for converting process fluids flowing through the beds. A mixing zone is located between the beds, and means are provided for injecting at least one fluid jet into the mixing zone and inclined against the flow of the process fluids between the beds to entrain process fluids therein and to radially mix the process fluids across the mixing zone.

In accordance with another broad aspect of the present invention, there is provided a method of converting process fluids in a fixed bed catalytic reactor that includes an upper catalyst bed, a lower catalyst bed below the upper catalyst bed, and a mixing zone between the upper bed and the lower bed. The method comprises the steps of flowing process fluids through the beds and the mixing zone to convert the process fluids; and injecting at least one fluid jet into the mixing zone and inclined against the flow of the process fluids to entrain process fluids in the jet and to radially mix the process fluids across the mixing zone.

In a downflow reactor, the fluid jet is positioned in the lower portion of the mixing zone and is upwardly inclined against the flow of the process fluids; and in an upflow reactor, the fluid jet is positioned at the top of the mixing zone and is downwardly inclined against the flow of the process fluids.

In accordance with a specific aspect of the present invention, a downflow fixed bed catalytic reactor is cylindrically shaped, and a nozzle is installed in the mixing zone near the intersection of the bottom surface and the sidewall of the mixing zone. The nozzle is upwardly inclined to point at the top surface of the mixing zone and diametrically across the top surface from two-thirds to one diameter distance of the mixing zone. In this position, the nozzle injects an upwardly directed fluid jet against the flow of the process fluids from the upper bed to entrain process fluids therein and to radially mix the process fluids across the mixing zone prior to the process fluids flowing into the lower bed.

Jets mix by the entrainment of the surrounding fluid into the jet. The induced flow within the mixing zone is therefore greater than the jet flow itself and leads to rapid mixing. The amount of fluid entrained by a jet is a function of jet Reynolds Number, jet expansion angle and jet length.

Thus, in accordance with the present invention, radial temperature homogeneity is achieved between catalyst beds by using jet mixing. As will be described hereinafter, the source of the jet fluid can be external to the reactor and/or a portion of process fluids that is bypassed across an upper bed at high velocity. One or more jets can be used. In addition, baffle plates and jet nozzles may be used to maximize mixing. Also, the source of jet fluid can be an injected quench fluid. Accordingly, the instant invention provides a simplified and relatively inexpensive means and method for providing radial mixing between catalyst beds by using jet mixing to minimize temperature maldistribution in fixed bed catalytic reactors.

DESCRIPTION OF SPECIFIC EMBODIMENTS

Figure 1:
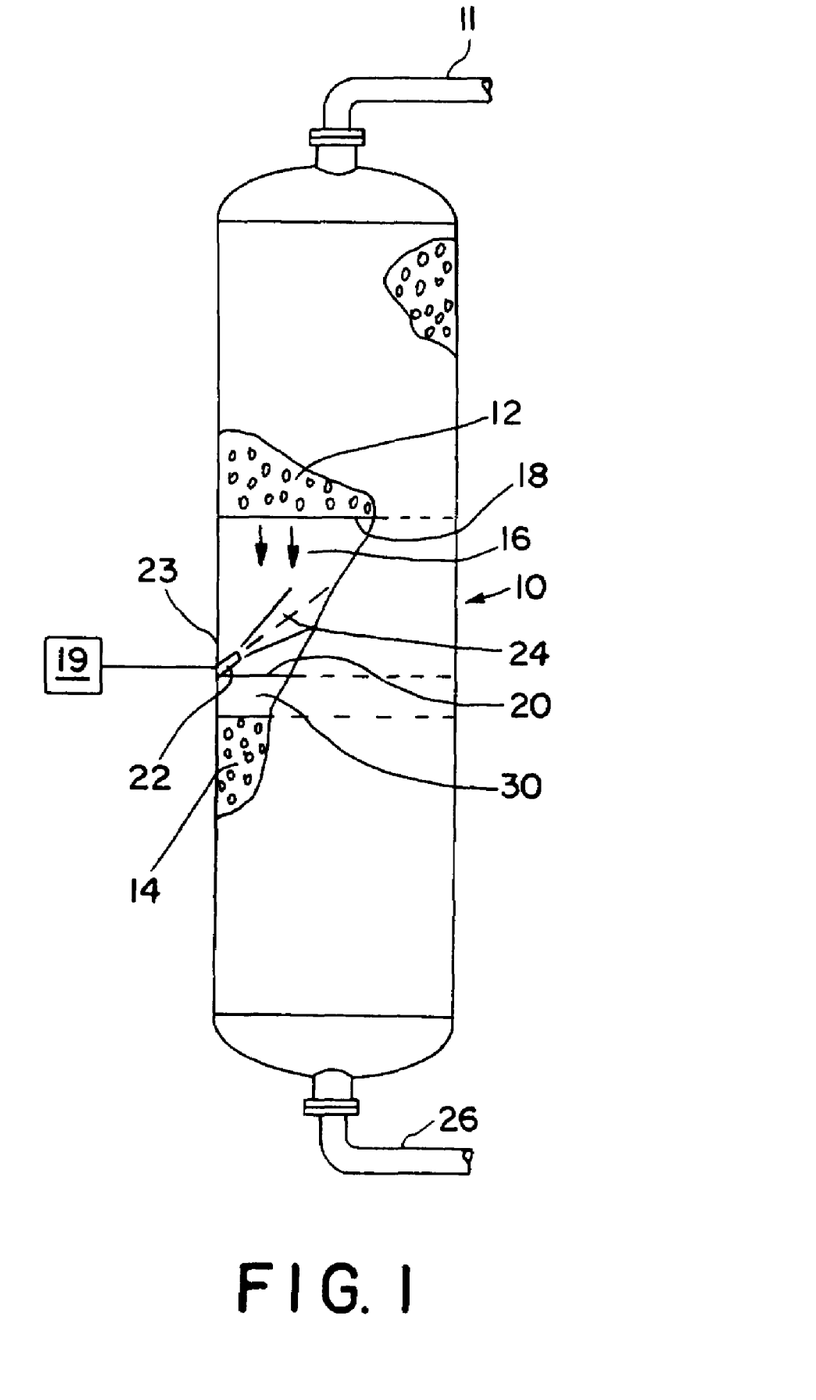
FIG. 1 is a side elevation view of a fixed bed reactor with portions in section showing a zone between upper and lower catalyst beds having a single nozzle in the zone for radially mixing process fluids in accordance with an embodiment of the present invention.
Figure 2:
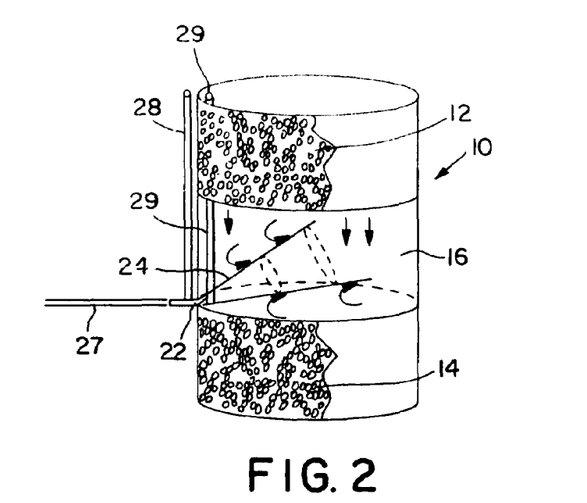
FIG. 2 is a schematic view of the mixing zone of FIG. 1 showing entrainment of process fluids by the fluid jet formed by the single nozzle.

With reference to FIGS. 1 and 2, there is shown a cylindrical fixed bed catalytic reactor 10 for converting process fluids. The reactor 10 has an upper catalyst bed 12 and a lower catalyst bed 14 below the upper catalyst bed 12 for converting process fluids entering the reactor 10 through an inlet conduit 11, flowing downwardly through the upper bed 12, a mixing zone 16, the lower bed 14, and exiting the reactor by an outlet conduit 26. The mixing zone 16 has a perforated top plate or surface 18 and a perforated bottom plate or surface 20 for passage of process fluids therethrough. Alternatively, the top surface of the lower bed 14 can function as the bottom surface of the mixing zone 16. Means including a nozzle 22 are provided in the mixing zone 16 for injecting at least one upwardly inclined fluid jet 24 into the mixing zone 16 against the flow of the process fluids (represented by the downwardly directed arrows) from the upper bed 12 to radially mix the process fluids prior to the process fluids flowing through the bottom surface 20 to the lower bed 14.

The mixing zone 16 extends transversely of the reactor 10 with essentially the same cross-sectional area as the upper and lower beds 12,14 t with no obstruction between the nozzle 22 and the top surface 18 or interior wall surface of the reactor 10 for baffling the fluid jet 24.

A distributor zone 30 preferably is positioned between the mixing zone 16 and the lower bed 14. It is common in fixed bed reactors to employ multiple catalyst beds with injection of gas or liquid between each pair of beds. Interbed injection may be needed to replenish depleted reactants, to quench the process fluids following exothermic reactions, or to introduce a different feed stream. If the beds contain different catalysts, it is possible to stage somewhat different reactions within a single vessel. In all cases, it is critical to establish good fluid distribution at the top of each catalyst bed. Suitable distributor systems are well known, such as those disclosed in U.S. Pat. Nos. 4,960,571, 5,484,578 and 5,799,877, which patents are hereby incorporated herein by reference.

The nozzle 22 is installed in the mixing zone 16 near the intersection of the bottom surface 20 and the sidewall 23 of the reactor 10. The nozzle 22 is preferably installed in the sidewall 23 for ease of access and maintenance. However, the nozzle may be positioned on the bottom surface 20 of the mixing zone 16.

The discharge velocity of the fluid jet 24 produced by the nozzle 22, and the exit opening of nozzle 22 have values adequate for providing penetration of the fluid jet across the interior of the mixing zone 16 and toward the top surface 18 on the far side of the mixing zone 16. The fluid jet is turbulent, and has a Reynolds Number >3000. Further, the exit opening of the nozzle 22 preferably is defined by:

$$d \geq \frac{H}{400\sin(\theta)};$$

wherein:

d=nozzle exit diameter, feet;

H=distance of nozzle below the top surface of the mixing zone, feet; and

θ=nozzle angle of inclination above horizontal, degrees.

Figures 3, 4:
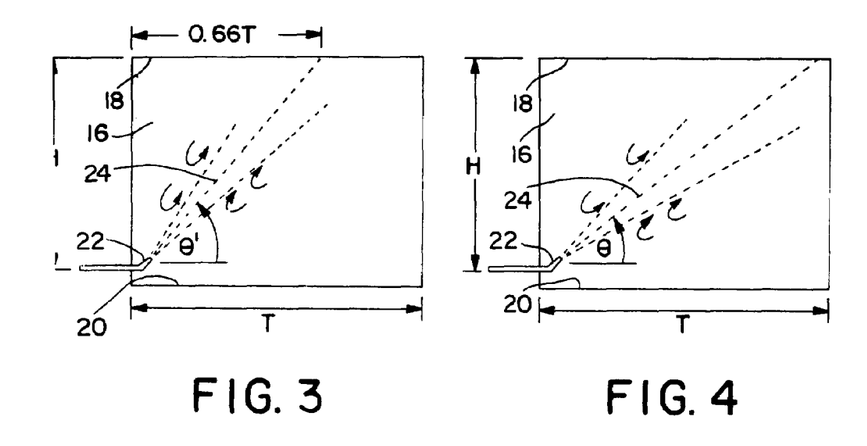
FIG. 3 is a graphical representation of the preferred maximum nozzle elevation angle for radially mixing process fluids in the embodiment of FIG. 1.
FIG. 4 a graphical representation of the preferred minimum nozzle elevation angle for radially mixing process fluids in the embodiment of FIG. 1.

With particular reference to FIGS. 3 and 4, the nozzle 22 preferably is upwardly inclined to point diametrically across the mixing zone 16 at the top surface 18 from two-thirds (0.66T) to one diameter distance (T) of the mixing zone 16. The nozzle injects the fluid jet 24 against the downward flow of the process fluids from the upper bed 12 to entrain the process fluids in the fluid jet 24 as indicated by the curved arrows in FIGS. 2-4. The process fluids are thereby radially mixed across the mixing zone 16 prior to the process fluids flowing into the lower bed 14.

With reference to FIGS. 3 and 4, the nozzle 22 has an angle in degrees of inclination above horizontal of from θ° (FIG. 4) to θ'° (FIG. 3), wherein:

$$\theta = \arctan\frac{H}{T},$$

degrees;

$$\theta' = \arctan\frac{H}{0.66T},$$

degrees;
H=distance of nozzle below the top surface of the mixing zone, feet; and
T=mixing zone diameter, feet.

Preferably, the nozzle 22 has an angle of inclination above horizontal of from θ° as shown in FIG. 4 to (θ+10°), wherein:

$$\theta = \arctan\frac{H}{T};$$

wherein:
θ=nozzle angle of inclination above horizontal, degrees;
H=distance of nozzle below the top surface of the mixing zone, feet; and
T=mixing zone diameter, feet.

More preferably, the nozzle 22 has an angle of inclination above horizontal of θ° as shown in FIG. 4.

In one embodiment of the present invention, the jet fluid is an injected quench fluid from an external source 19 (FIG. 1). As should be readily appreciated, the present invention is suitable for use in various catalytic processes through which reactants or partially reacted reactants and quench fluids are to be homogeneously mixed so as to control the temperature profile of such materials or their composition, or both. Indeed, the quench fluids may be all gases, all liquids or a mixture of gases and liquids, depending upon the nature of the process being carried out in the reactor. Quench fluids frequently contain hydrogen.

Thus, the present invention provides a quench stream in which the jet velocity and direction mixes all of the flow to provide a blended total flow having a more uniform radial temperature before the process fluid flow enters the next bed 14. As discussed above, the discharge velocity of the fluid jet 24, and the exit opening of the nozzle 22 need to have values adequate for providing penetration of the fluid jet across the interior of the mixing zone 16 and toward the top surface 18 on the far side of the mixing zone 16, and to provide a turbulent fluid jet having a Reynolds Number >3000. The velocity of the quench stream exiting the nozzle is very high, e.g., 300 ft/sec, which provides energy to direct the turbulent fluid jet against the flow of the process fluids from the upper bed 12 and thereby entrain a portion of the process fluids in the fluid jet 24 and radially mix the process fluids across the mixing zone prior to the process fluids flowing into the lower bed 14.

Jet mixing of the process fluids in accordance with the present invention provides an injection quench stream having a jet velocity sufficiently high to mix all of the process fluids in the mixing zone 16. Thus, the present invention provides for injecting the quench fluid to not only blend with one part of the process fluid flow but to blend with the whole total process fluid flow to make the process fluid flow more uniform from a temperature point of view before it enters the next bed 14.

Figure 5:
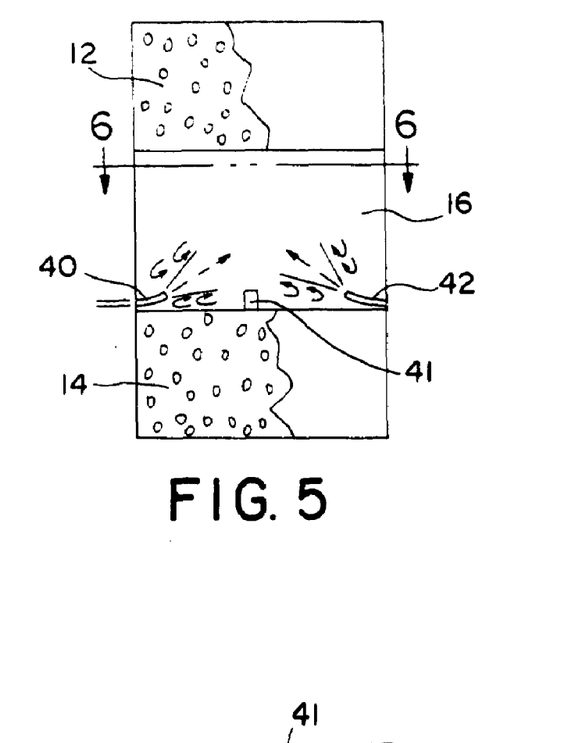
FIG. 5 is a schematic view of another embodiment of the present invention wherein a plurality of inwardly and upwardly directed nozzles are provided for radially mixing process fluids in a zone between catalyst beds wherein the nozzle is at the lower end of a conduit passing through the upper catalyst bed.
Figure 6:
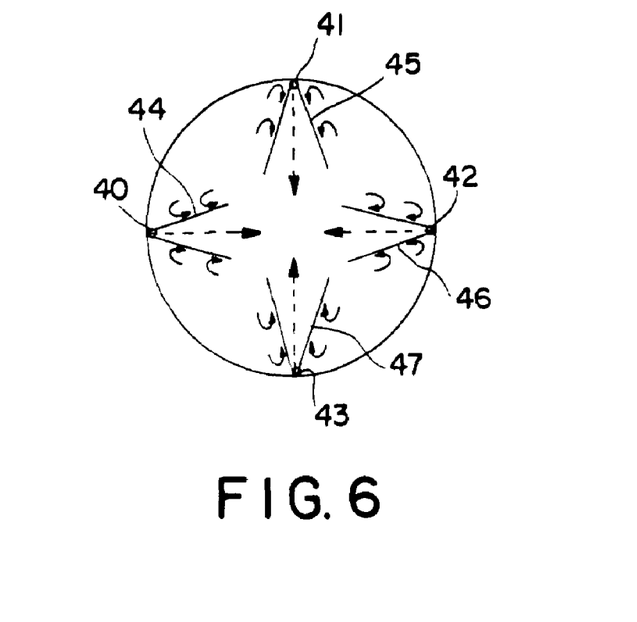
FIG. 6 is a cross-sectional view taken along line 6-6 of FIG. 5.

With reference to FIGS. 5 and 6, the injecting means comprises a plurality of inwardly directed and upwardly inclined nozzles 40-43 to provide a plurality of opposing fluid jets 44-47 for entraining the process fluids therein as indicated by the curved arrows. In this embodiment, the nozzles 40-43 are equally spaced about the interior of the mixing zone 16.

Figure 7:
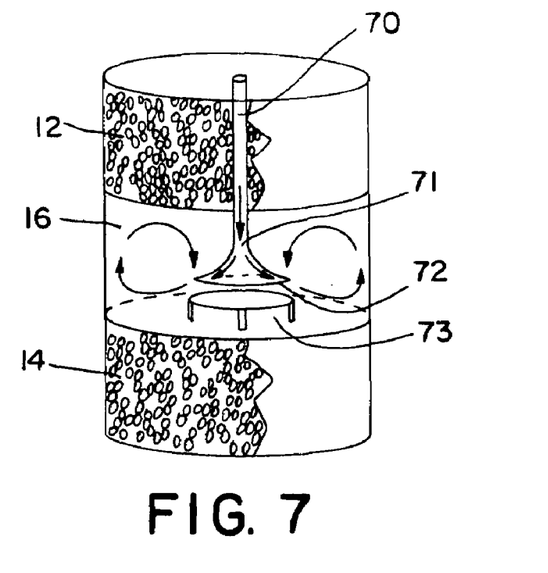
FIG. 7 is a schematic view of another embodiment of the present invention wherein the nozzle is at the lower end of a conduit passing through the upper catalyst bed.

With reference to FIG. 7, there is shown an embodiment wherein a conduit 70 passes downwardly through the upper catalyst bed 12 to bypass it. The conduit 70 has a nozzle portion 71 and an outwardly flared end 72 downstream of the nozzle portion 71. A deflecting platform 73 is spaced from the flared end 72 for deflecting the fluid jet exiting the flared end outwardly and upwardly as indicated by the curved arrows. The fluid jet exiting the flared end 72 radially flows outwardly and upwardly for 360° from between the flared end 72 and the deflecting platform 73.

Figure 8:
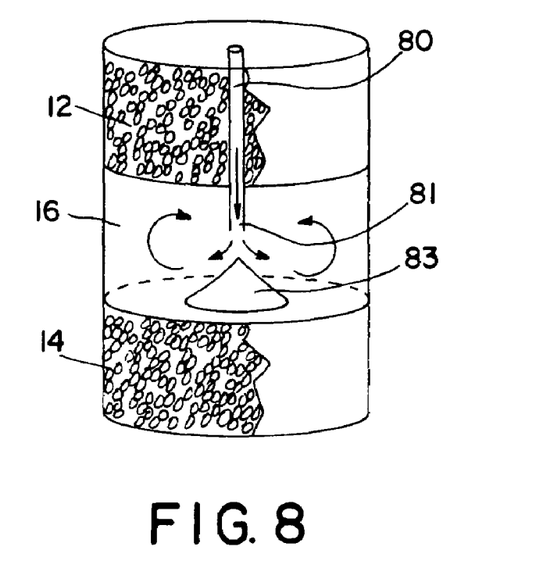
FIG. 8 is a schematic view of yet another embodiment of the present invention for radially mixing process fluids in a zone between catalyst beds wherein the nozzle is at the lower end of a conduit passing through the upper catalyst bed.

FIG. 8 shows another embodiment wherein a conduit 80 passes through the upper catalyst bed 12 to bypass it. The conduit 80 has a nozzle portion 81 at the bottom end thereof. A deflecting means in the form an upwardly pointed conical structure 83 below the nozzle portion 81 is provided for deflecting the fluid jet exiting the nozzle portion 81 outwardly and upwardly as indicated by the curved arrows.

The embodiments of FIGS. 7 and 8 can provide for an automatic bypass if the top of a bed becomes very fouled as a result of an accumulation of non-process fluid substances, e.g., dust particles, sludge etc. Within a few months of starting a reactor with a fresh catalyst load the pressure drop across the bed builds up because of the accumulation of such non-process fluid substances. This build up may require that the reactor be shut down to permit reentry into the reactor for cleaning and perhaps restocking the catalyst in the reactor. To postpone reentry, the embodiments of FIGS. 7 and 8 can be used in shallow beds initially. When the bed is clean most of the flow will go to the bed and very little flow will go to the bypass tube. But, as the bed fouls the pressure drop across the bed and the tube increases resulting in a larger fraction of the process fluid flow entering the tube to bypass the bed.

As shown in FIG. 2, the source of the fluid jet can be through an upper bed bypass conduit 29 that passes through the upper bed 12 and/or a bypass conduit 28 that exits the reactor upstream of the upper bed 12 and/or a supply external to the reactor 27.

The high energy in such bypassing tubes has not been used in the prior art to a maximum efficiency. However, the embodiments of FIGS. 7 and 8 use this heretofore wasted energy to blend the process fluids in the mixing zone 16 before the process fluids enter the next bed.

The reactor of the present invention can be used in any fixed bed process such as a hydroprocessor for converting process fluids in one or more processes of hydrogenation, hydrodesulfurization, hydrodenitrogenation, hydrotreating, hydrofinishing and hydrocracking. The reactor can also be used to convert process fluids in an aromatic saturation process, or to convert process fluids in a reforming process with or without hydrogen.

Figure 9:
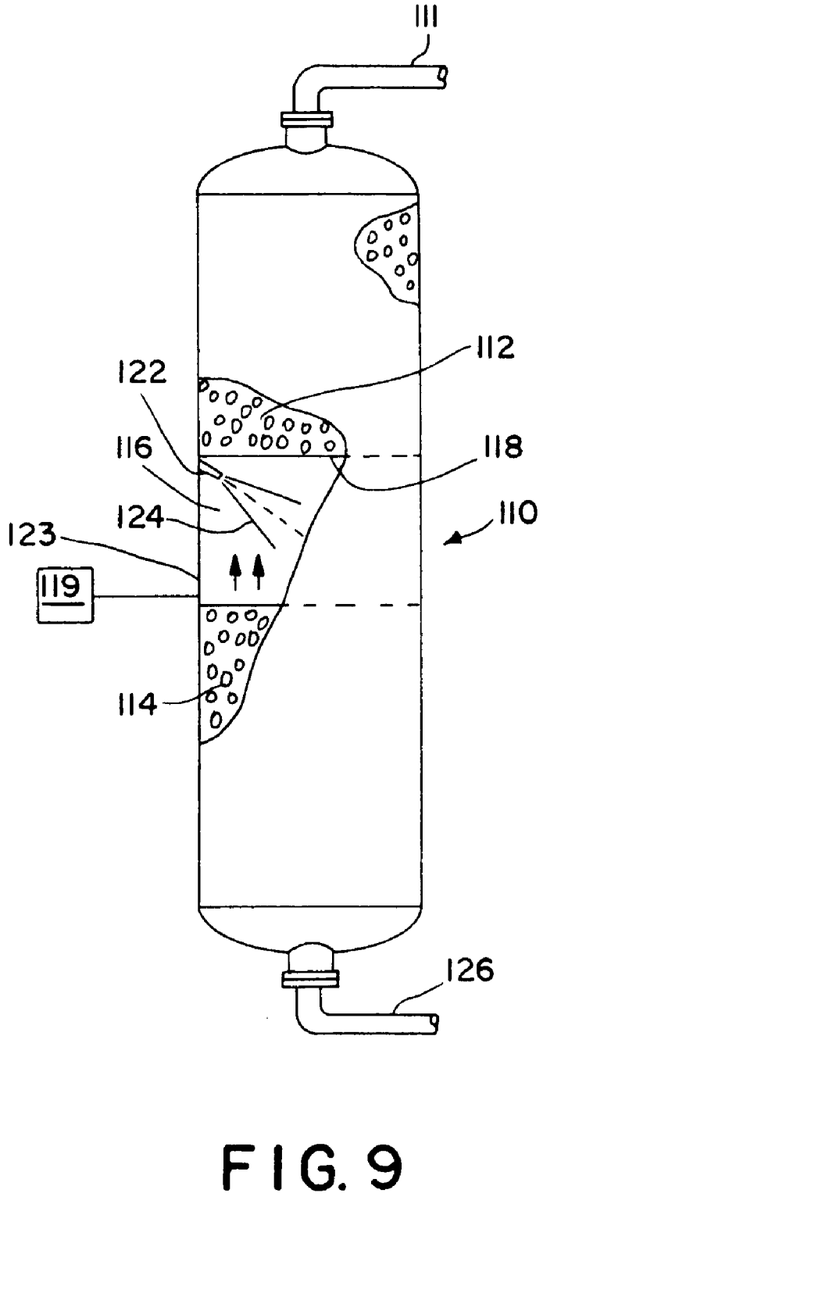
FIG. 9 is a side elevation view of another embodiment of the instant invention wherein a fixed bed reactor is shown with portions in section, and a zone between upper and lower catalyst beds having a single downwardly directed nozzle in the zone for radially mixing process fluids.

The invention also contemplates an upflow reactor such as shown in FIG. 9 where the reactants enter at or near the bottom 126 of the reactor 110, flow upwardly through the lower bed 114 and the upper bed 112 as indicated by the arrows, and the reaction products are removed at or near the top 111 of the reactor 110. In this embodiment the means including a nozzle 122 are provided at the top or upper portion of the mixing zone 116 for injecting at least one downwardly inclined fluid jet 124 into the mixing zone 116 against the upward flow of the process fluids from the lower bed 114 to radially mix the process fluids prior to the process fluids flowing through the top surface 118 of the mixing zone 116 into the upper bed 112.

EXAMPLE

Following are calculations that were made as one example of the single jet embodiment of FIG. 2.
  reactor diameter=12 ft;
  mixing zone height=3 ft;
  bed superficial velocity=0.5 ft/s;
  density of the jet fluid ($\rho$)=2 lb/ft$^3$;
  $V_{flow}/V_{jet}$>10;
  reactor flow rate ($V_{flow}$)=56.5 ft$^3$/s;
  jet flow rate ($V_{jet}$)=3 ft$^3$/s;
  jet nozzle sized at 1.8 in;
  pressure drop at the jet nozzle ($\Delta P$)=6.9 psi; and
  time for one turn over =6 s.

The velocity of the jet stream 24 exiting the nozzle is at least 35 ft/sec, and may be in the order of 170 ft/sec. Preferably the nozzle discharge velocity is in the range of 35 ft/sec to 325 ft/sec to provide sufficient energy to direct a turbulent fluid jet against the flow of the process fluids from the upper bed 12 and thereby entrain a portion of the process fluids in the fluid jet 24 and radially mix the process fluids across the mixing zone 16 prior to the process fluids flowing into the lower bed 14.

Although the present invention has been described with reference to specific embodiments, it is to be understood that modifications and variations may be utilized without departing from the spirit and scope of this invention, as those skilled in the art will readily understand. Such modifications and variations are considered to be part of the invention, provided they come within the scope of the appended claims and their equivalents.

What is claimed is:

1. A fixed bed catalytic reactor for converting process fluids comprising:
  an upper catalyst bed and a lower catalyst bed below said upper catalyst bed for converting process fluids flowing through said upper bed and said lower bed;
  an inlet conduit for feeding the process fluids into the reactor adjacent one of the upper catalyst bed and the lower catalyst bed;
  an outlet conduit for withdrawing process fluids from the reactor adjacent another one of the upper catalyst bed and the lower catalyst bed;
  a mixing zone between said upper bed and said lower bed, said mixing zone having a top surface and a bottom surface;
  at least one nozzle for injecting at least one fluid jet in said mixing zone, said fluid jet being directional inclined against the flow of said process fluids between said upper bed and said lower bed to radially mix said process fluids, wherein the at least one nozzle injecting the at least one fluid jet at a discharge velocity of at least 170 ft/sec; and
  at least one by-pass conduit for withdrawing a portion of the process fluids after entering the reactor through the inlet conduit before the process fluids pass through one of the upper catalyst bed and the lower catalyst bed, wherein the at least one by-pass conduit having an inlet located within the reactor,
  wherein the at least one by-pass conduit being operatively connected to the at least one nozzle to supply process fluid to the at least one nozzle.

2. The reactor of claim 1 wherein said process fluids flow downwardly from said upper bed, through said mixing zone and through said lower bed, and wherein said fluid jet is upwardly inclined against the flow of said process fluids.

3. The reactor of claim 1, further comprising a distributor zone between said mixing zone and said lower catalyst bed.

4. The reactor of claim 1, wherein the at least one nozzle includes a plurality of nozzles that are equally spaced about an interior periphery of said mixing zone.

5. The reactor of claim 1, wherein said mixing zone extends transversely of said reactor and has essentially the same cross-sectional area as said upper bed and said lower bed.

6. The reactor of claim 1, wherein the at least one fluid jet has a Reynolds Number >3000.

7. The reactor of claim 1, wherein each of the at least one nozzle has an angle of inclination of $\theta°$ to $\theta+10°$ as defined by:

$$\theta = \arctan\frac{H}{T};$$

wherein:
  $\theta$=nozzle angle of inclination above horizontal, degrees;
  H=distance of nozzle below said top surface of said mixing zone, feet; and
  T=mixing zone diameter, feet.

8. The reactor of claim 1, wherein each of the at least one nozzle has an angle in degrees of inclination above horizontal of between $\theta°$ and $\theta'°$,
wherein:

$$\theta = \arctan\frac{H}{T};$$

$$\theta' = \arctan\frac{H}{0.66T};$$

H=distance of nozzle below said top surface said mixing zone, feet; and
T=mixing zone diameter, feet.

9. The reactor according to claim 1, wherein each of the at least one nozzle having an exit opening, wherein said exit opening is defined by:

$$d \geq \frac{H}{400\sin(\theta)};$$

wherein:
  d=nozzle exit diameter, feet;
  H=distance of nozzle below said top surface of said mixing zone, feet; and
  $\theta$=nozzle angle of inclination above horizontal, degrees.

10. The reactor of claim 1, wherein the reactor is a hydroprocessor and includes means for converting process fluids in one or more processes of hydrogenation, hydrodesulfurization, hydrodenitrogenation, hydrotreating, hydrofinishing and hydrocracking.

11. The reactor of claim 1, wherein the reactor includes means for convening process fluids in an aromatic saturation process.

12. The reactor of claim 1, wherein the reactor includes means for converting process fluids in a reforming process with or without hydrogen.

13. A method of converting process fluids in a fixed bed catalytic reactor, the reactor comprising an inlet conduit for feeding the process fluids into the reactor, an upper catalyst bed and a lower catalyst bed below said upper catalyst bed and a mixing zone between said upper bed and said lower bed, said mixing zone having a top surface and a bottom surface, end at least one by-pass conduit for withdrawing at least a portion of the process fluids from the reactor; said method comprising:

introducing process fluids into the reactor through the inlet conduit;

withdrawing a portion of the process fluids from within the reactor through the at least one by-pass conduit;

flowing a remaining portion of the process fluids trough one of the upper catalyst bed and the lower catalyst bed through the mixing zone into the other of the upper catalyst bed and the lower catalyst bed for converting the process fluids;

supplying the portion of the process fluids withdrawn from the reactor through the least one by-pass conduit to at least one injection nozzle; and injecting the portion of the process fluid as a fluid jet through the at least one injection nozzle into said mixing zone at an angle inclined against the flow of the remaining process fluids, wherein the fluid jet is injected into said mixing zone at a discharge velocity of at least 170 ft/sec.

14. The method of claim 13, wherein said fluid jet is turbulent.

15. The method of claim 13, wherein said fluid jet has a Reynolds Number >3000.

16. The method according to claim 13, wherein said reactor has a cylindrical shape, and wherein said at least one nozzle has an angle in degrees of inclination above horizontal of between $\theta°$ and $\theta'°$, wherein:

$$\theta = \arctan\frac{H}{T};$$

$$\theta' = \arctan\frac{H}{0.66T};$$

H=distance of nozzle below said top surface of said mixing zone, feet; and

T=mixing zone diameter, feet.

17. The method according to claim 13, wherein each of the at least one nozzle having an exit opening defined by:

$$d \geq \frac{H}{400\sin(\theta)};$$

wherein:

d=nozzle exit diameter, feet;

H=distance of nozzle below said top surface of said mixing zone, feet; and $\theta$=nozzle angle of inclination above horizontal, degrees.

* * * * *